United States Patent

[11] 3,576,970

[72] Inventor James R. Cherry
 Barrington, Ill.
[21] Appl. No. 862,785
[22] Filed Oct. 1, 1969
[45] Patented May 4, 1971
[73] Assignee Motorola, Inc.
 Franklin Park, Ill.

[54] QUICK HEAT AND ELECTRICAL POWER-PRODUCING SYSTEM
 6 Claims, 2 Drawing Figs.
[52] U.S. Cl. .................................................. 219/279,
 219/202, 307/310
[51] Int. Cl. ...................................................... F27d 11/00
[50] Field of Search ............................................. 219/202,
 279; 307/310

[56] References Cited
 UNITED STATES PATENTS
3,440,398 4/1969 Nilssen ........................ 219/279

Primary Examiner—J. V. Truhe
Assistant Examiner—C. L. Albritton
Attorney—Mueller and Aichele ABSTRACT: A system for producing either quick heat or electrical power, or both, for automobiles comprises a conventional alternator, an auxiliary alternator and a control system therefor. In the quick-heat mode the control system connects the field winding of the auxiliary alternator to load the output of the conventional alternator thereby avoiding the generation of voltage transients. If quick heat is not desired, the conventional alternator provides only electrical power and the auxiliary alternator has no output.

PATENTED MAY 4 1971

3,576,970

INVENTOR
JAMES R. CHERRY

BY
Mueller, Aichele & Rauner
ATTYS.

QUICK HEAT AND ELECTRICAL POWER-PRODUCING SYSTEM

BACKGROUND OF THE INVENTION

Automotive vehicles with fluid-cooled, internal combustion engines usually come equipped with conventional heater systems, each including a radiator for delivering heat from the engine coolant into the air and a fan for forcing the heated air into the passenger compartment to warm the occupants thereof and to defrost the windshield. As most drivers and passengers of automobiles are aware when the weather, and hence the engine is cold, a substantial length of time is required after the engine is started before the coolant is heated to a sufficient temperature to enable the conventional heating system to effectively produce heat. During this time the occupants of the vehicle must endure the cold, and ice may form on the windshield thereby impairing the driver's visibility.

To solve these problems, auxiliary quick-heat systems have been proposed for instantly supplying heat during the interval of time beginning immediately after the engine is started and ending at some later time when the conventional heating system is operative. These prior art heating systems usually convert electrical energy instantly into heat by supplying electrical power from the generator or battery of the vehicle to a heat-producing load comprised of resistive heating elements located near the fan of the conventional heating system so that this heated air can be forced into the passenger compartment. To produce enough of this quick or instant heat to effectively and rapidly heat the passenger compartment while simultaneously defrosting the windshield, it is necessary that a substantial amount of current be applied to the heating elements.

One prior art system suggests that one set of switching contacts such as those of a heavy duty relay can be placed between the output of the conventional alternator or generator of an automotive vehicle to alternately connect power to either the resistive heating elements or the electrical load of the automotive circuitry. Because all of the current must be delivered through this one set of contacts, they are subjected to the deleterious effects of arcing and, consequently, may have to be regularly replaced. MOreover, the conventional automotive generator is not designed to supply enough electrical power for quickly warming the passenger compartment, effectively defrosting the windshield and operating the electrical system of the automotive vehicle. FUrthermore, the foregoing approach is undesirable because the storage battery, without charging current being delivered thereto, can sustain the electrical requirements of the automotive vehicle for only a limited time; and the solid-state components of the rectifier and regulator of the alternator and switching contacts associated therewith may be adversely affected by voltage transients developed by the relatively large amounts of energy released from the inductance of the windings when the alternator output is briefly open-circuited while being switched between the electrical load of the automotive vehicle and the quick heat-producing load.

SUMMARY OF THE INVENTION

It is one object of the invention to provide an improved, auxiliary heating system for instantly supplying heat to the passenger compartment of an automotive vehicle.

It is another object of this invention to provide a simple, reliable, power-generating system suitable for use in an automotive vehicle which will deliver a substantial amount of current to quick-heating elements without requiring only a single set of contacts to switch all of the current thereto and which will supply the automotive battery and electrical system with adequate power while quick heat is being produced.

A further object of this invention is to provide an electrical power and instant-heat-generating system which does not open-circuit the alternator or generator thereof while it is developing electrical power to thereby protect the components connected thereto from voltage transients which would otherwise be produced.

In one embodiment of the invention comprising a heat- and electrical power-generating system for use with an automotive vehicle having a conventional heating system, first and second resistive quick-heat loads are placed between the fan and the outlet of the plenum chamber of the conventional heating system. When quick or instant heat is desired, the load provided by the field of an auxiliary alternator whose output is permanently connected to the first of the quick-heat loads is coupled to the output of the conventional alternator of the automotive vehicle thereby energizing the first quick-heat load. Subsequently, the output of the conventional alternator is disconnected from the automotive load presented by the circuitry of the vehicle while being connected to and thus energizing the second quick-heat load. When the temperature in the plenum chamber reaches a predetermined maximum, a temperature-sensitive switch reconnects the output of the conventional alternator to the automotive load to recharge the automotive storage battery and disconnects the same from the second quick-heat load. If the temperature in the plenum chamber falls below a predetermined minimum, the temperature-sensitive switch reconnects the output of the conventional automotive generator to the second quick-heat load while disconnecting it from the automotive load. As the temperature in the plenum chamber again reaches the aforementioned maximum, the cycle will repeat. When quick heat is no longer desired, the automotive load is reconnected to the output of the conventional alternator as the second quick-heat load is disconnected, and then the load provided by the field of the auxiliary alternator is removed from the conventional alternator.

DETAILED DESCRIPTION OF THE PREFERRED EMBODIMENT

A preferred embodiment of the invention is in the form of a source of electrical power and quick or instant heat which supplements the conventional radiator fan heating system and provides electrical power for operating the electrical system of an automotive vehicle. The quick heat-producing function is ordinarily used only during the time between when the engine is started and when the conventional heating system becomes effective, whereas the electrical power generation function is ordinarily employed whenever the engine is operative.

Figure 1:
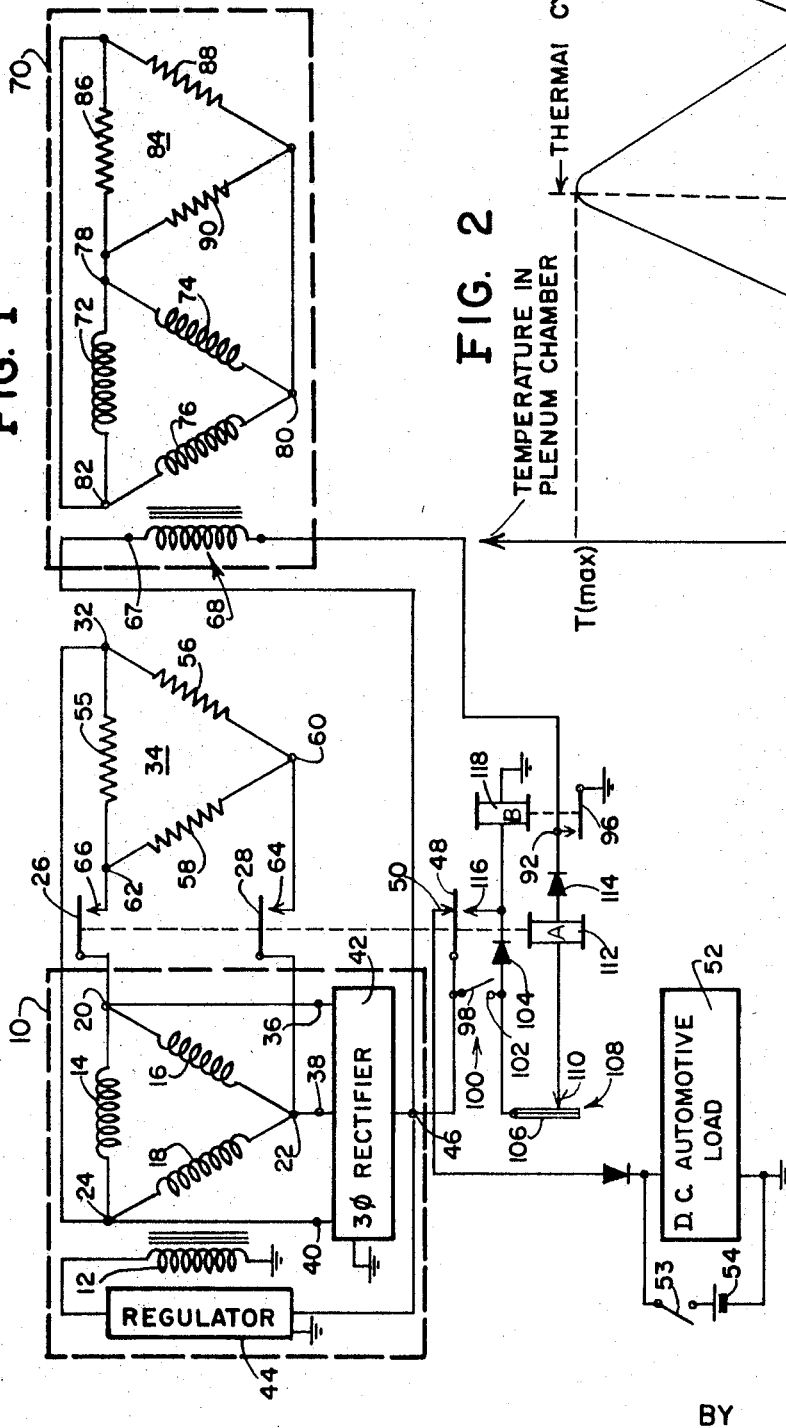
FIG. 1 is a schematic diagram of the quick heat- and power-generating system of one embodiment of the invention.

Referring to FIG. 1, conventional automotive alternator 10 is comprised of rotating field winding 12 which is wound on a rotor and located in proximity to delta-connected stator windings 14, 16 and 18. As the rotor is turned by the engine a three-phase alternating voltage is developed at terminals 20, 22 and 24 of the stator which are respectively connected to normally open, movable contacts 26 and 28, of relay A and terminal 32 of quick heat-producing load 34. Terminals 20, 22 and 24 are also respectively connected to input terminals 36, 38 and 40 of a three-phase, solid-state rectifier 42 which can have any one of several known circuit configurations. Regulator 44 which may also include solid-state devices is connected between the direct-current output 46 of rectifier 42 and field winding 12 so that it can control the amount of current flowing through the field winding thereby regulating the amplitude of the DC voltage at output 46. Movable contact or switching portion 48 of relay A normally connects output 46 to fixed contact 50 thus delivering regulated direct current to the direct-current automotive load 52 which might be comprised of the ignition system, radio, lights, heater, fan, etc., of the automotive vehicle. When ignition switch 53 is closed automotive storage battery 54 is connected in parallel with automotive load 52.

As electrical power is generated by alternator 10, a relatively substantial amount of energy is inductively stored in stator windings 14, 16 and 18. If movable contact 48 of relay A was disconnected from fixed contact 50 thus removing the automotive load 52 from rectifier output 46, and if there was no other load connected to the alternator, the energy stored in the stator windings might cause a voltage transient of considerable amplitude which could permanently damage the solid-state components of rectifier 42 and regulator 44. Furthermore, this transient might also cause arcing between any switching contacts coupled to the stator windings. All the while alternator 10 is producing electrical power, therefore, it is desirable to have an electrical load connected thereto.

Quick-heat load 34 is comprised of delta-connected heating elements 55, 56 and 58 which are joined together at terminals 32, 60 and 62. These elements are composed of a resistive material suitable for transforming electrical energy into heat energy. Terminal 60 is connected to fixed contact 64 of relay A and terminal 62 is likewise connected to fixed contact 66 of relay A. Quick-heat load 34 is located in the plenum chamber or duct leading from the conventional heater into the passenger compartment of the automotive vehicle so that the fan of the conventional heating system can force the air heated by these elements into the compartment.

Rectifier output terminal 46 is connected to end 67 of field winding 68 of alternator 70 which also has delta-connected stator windings 72, 74 and 76 joined together at terminals 78, 80 and 82. Another quick heat-producing delta load 84 comprised of resistive heating elements 86, 88 and 90 is connected directly to the terminals 78, 80 and 82 of the stator windings. These heating elements are similarly composed of the same material as the elements of quick-heat load 34 and they are also arranged in the plenum chamber, adjacent to load 34.

Output terminal 46 of rectifier 42 is also connected to movable contact 98 of manually operated quick-heat switch 100. Fixed contact 102 of switch 100 is connected both to the anode of diode 104 and to the normally closed, movable contact 106 of thermal or temperature-responsive switch 108 which may be a bimetal switch whose contacts 106 and 110 open at a predetermined maximum temperature and close at a predetermined minimum temperature. Fixed contact 110 of thermal switch 108 is connected through control portion or relay coil 112 of relay A to the anode of semiconductor diode 114 which provides a conductive path for current passing through coil 112 to fixed contact 92 of relay B. Fixed contact 116 of relay A cooperates with movable contact 48 thereof to provide a path for the DC voltage from rectifier output 46 through control portion or relay coil 118 of relay B which is connected between ground and the cathode of diode 104.

In operation, when quick heat is not desired, quick-heat switch 100 is open and the regulated, direct-current voltage of alternator 10 is coupled from rectifier output 46 through contact 48 of relay A to the direct-current load 52. No power is delivered to quick-heat load 34 because contacts 26 and 28 of relay A are open, and no power is delivered to quick heat load 84 because, even though field winding 68 of alternator 70 is being rotated by the engine, no current is supplied therethrough since contact 96 of relay B is in its normally open position.

When quick or instant heat is desired, switching portion 98 of quick-heat switch 100 is manually closed by an operator. Assume for purposes of explanation that this closure occurs at the instant in time labeled $t_0$ on FIG. 2, thereby causing current to be applied from rectifier output 46 through diode 104 to energize relay coil 118 of relay B. Consequently, at a slightly subsequent time $t_1$, relay contacts 92 and 96 of relay B close thereby enabling current from output 46 to flow through the electrical load presented by rotating field winding 68 and thus energizing quick-heat load 84 so that heat immediately begins to be developed in the plenum chamber.

Figure 2:
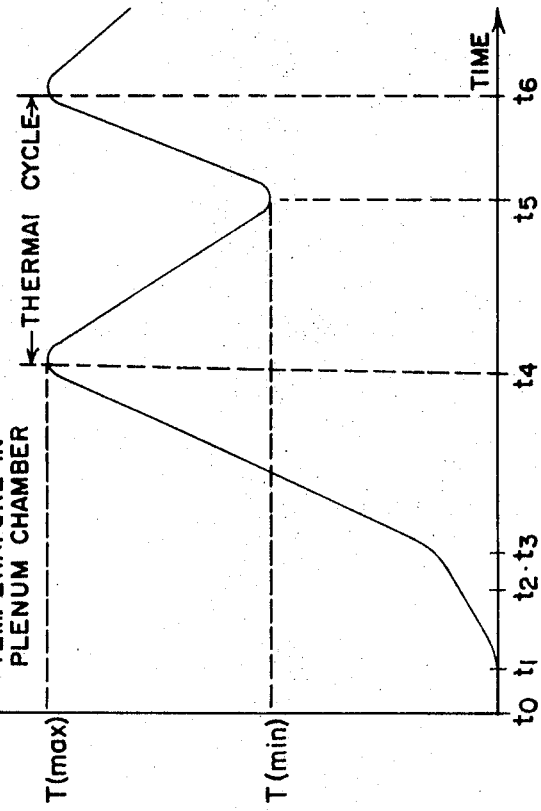
FIG. 2 is a graphic representation of the production of quick heat as a qualitative function of time by the system of FIG. 1.

The closure of contacts 92 and 96 also energizes relay coil 112 of relay A at time $t_1$ through normally closed thermal switch 108 and diode 114. As a result at time $t_2$ switching portion or movable contact 48 of relay A breaks contact with fixed contact 50 thereby disconnecting automotive load 52 from rectifier output 46 and at time $t_3$ it makes connection with fixed contact 116. Moreover, at about time $t_3$ contacts 26, 66 and 28, 64 of relay A connect quick-heat load 34 to the alternating voltage across the stator windings of alternator 10. Quick-heat load 34, therefore, produces heat which combines with the heat already being produced by quick-heat load 84. Accordingly, the temperature of the plenum chamber is rapidly raised to the aforementioned predetermined maximum temperature $T_{(max)}$ of thermal switch 108, which might be about 120° F. This causes normally closed contacts 106 and 110 thereof to open at time $t_4$ thus deenergizing relay coil 112 of relay A which operates movable contact 48 into connection with fixed contact 50 thereby reconnecting automotive load 52 to rectified output 46 and movable contacts 26 and 28 thereby disconnecting heat-producing load 34 from alternator 10. It is pointed out that the relative times and temperatures shown in FIG. 2 are for explanation only, and they may vary widely in various systems coming within the scope of the invention. Storage battery 54, which sustains the electrical needs of the automotive vehicle while switching portion 48 contacts terminal 116, is now recharged by the direct current from output 46.

If the conventional heating system is still not generating enough heat energy, the temperature in the plenum chamber, as shown in FIG. 2, may slowly drop because it is being provided only with heat from quick-heat load 84. At time $t_5$ when the predetermined minimum temperature $T_{(min)}$ of thermal switch 108, which might be about 100° F. is reached in the plenum chamber, contacts 106 and 110 of thermal switch 108 again close. This reenergizes relay coil 112 of relay A to operate movable contact 48 into reconnection with fixed contact 116 to disconnect automotive load 52 from alternator 10 and movable contacts 26 and 28 which reconnects quick-heat load 34. Inasmuch as both the quick-heat loads are again being energized the temperature of the plenum chamber, as shown in FIG. 2, again rises until $T_{(max)}$ is reached at $t_6$ whereat the foregoing thermal cycle begins anew. This thermal cycling will continue until the temperature in the plenum chamber is either maintained by quick-heat load 84 itself, or by quick-heat load 84 in cooperation with the heat from the conventional heating system which is generated in greater abundance as the thermal cycling increases and the engine warms up.

It is pointed out that the system of this embodiment of the invention utilizes the output of alternator 10 to alternately either provide quick heat in cooperation with alternator 70 or to charge automotive storage battery 54. A sufficient amount of heat is consequently produced to simultaneously heat the passenger compartment and defrost the windshield, and enough electrical power is supplied to fill the electrical demands of the vehicle.

When quick heat is no longer desired, thermal switch 108 may possibly be in either its open or in its closed position. If in its open position, then relay coil 112 of relay A is deenergized and automotive load 52 is connected to and quick-heat load 34 is disconnected from alternator 10. If quick-heat switch 100 is opened under these conditions, relay coil 118 will be deenergized to open switch contacts 92 and 96 thereby removing the ground on filed winding 68 and consequently deenergizing quick-heat load 84.

Alternatively, if thermal switch 108 is closed, when quick heat is no longer desired, then coil 112 is energized thus causing quick-heat load 34 to be connected and automotive load 52 to be disconnected from alternator 10. If quick-heat switch 100 is opened under these conditions, power to relay coil 112 of relay A is immediately removed but due to a slight delay in operation of relay A power remains momentarily connected to relay coil 118 of relay B by switching portion 48. At a slightly later time, switching portions 48, 26 and 28 of relay A begin moving toward their fixed positions thus deenergizing relay coil 118 of relay B. Because of the delay inherent in relay B, however, switching portion 48 will have made connection with contact 50 thereby connecting automotive load 52 to alternator 10 before movable contact 96 of relay B breaks with fixed contact 92 thereby removing the load of field 68 from alternator 10.

It should be noted that when quick heat is desired, the load presented by field winding 68 is first connected to alternator 10 before automotive load 52 is disconnected therefrom; that the load presented by field winding 68 remains connected to alternator 10 during the aforementioned thermal cycles while automotive load 52 and quick-heat load 34 are alternately connected and disconnected from alternator 10; and, that when quick heat is no longer desired, automotive load 52 is reconnected to alternator 10 before the load presented by field winding 68 is disconnected therefrom. Alternator 10 is therefore continuously loaded to insure that the previously mentioned undesirable voltage transients are not generated.

What has been described, therefore, is an improved quick heat- and electrical power-producing system which utilizes both a conventional alternator and an auxiliary alternator for use in an automotive vehicle. The system utilizes one set of contacts to directly switch only that part of the total electrical power converted into quick heat which is supplied by the conventional alternator, and it keeps the conventional alternator continuously loaded thereby avoiding the undesirable transients which could otherwise destroy the solid-state components thereof.

I claim:

1. An electrical power- and heat-producing system for an automotive vehicle, including in combination, first electrical generator means having its output connected to a first heat-producing load, second electrical generator means, first switching means selectively coupling the output of said second generator means to said first generator means, second switching means selectively connecting the output of said second generator means to the electrical load of the automotive vehicle, control circuit means for operating said first and second switching means, said control circuit means being operable to a first condition whereby said first switching means couples said second generator means to said first generator means so that said first generator means is energized by said second generator means, and said second switching means subsequently disconnects said electrical load of the automotive vehicle from said second generator means, said control circuit means being operable to a second condition whereby said second switching means connects said electrical load of the automotive vehicle to said second generator means, and said first switching means subsequently uncouples said first generator means from said second generator means to deenergize said first generator means, said second generator means thereby being continuously loaded to prevent the generation of undesirable transients therein.

2. An electrical power- and heat-producing system for an automotive vehicle, including in combination, first electrical generator means having its output connected to a first heat-producing load; second electrical generator means having first and second outputs; first relay means having a first control coil for operating a first switching means to selectively couple said second output to the field of said first electrical generator means; second relay means having a second control coil for operating both a second switching means which selectively connects said first output to a second heat-producing load and a third switching means which selectively connects said second output to the electrical load of the automotive vehicle; control means electrically connected with said first and second control coils for operating said first, second and third switching means; said control means being operable to a first condition whereby said first switching means couples said field of the first generator means to said second output, said second switching means connects said second heat-producing load to said first output, and said third switching means subsequently disconnects said electrical load of the automotive vehicle from said second output; said control means being operable to a second condition whereby said third switching means connects said electrical load of the automotive vehicle to said second output and said second switching means disconnects said second heat-producing load from said first output and said first switching means subsequently uncouples said field of the first electrical generator means from said first output.

3. The electrical power and heat producing system of claim 2 wherein said control means further includes in combination, four the switching means making contact between two terminals thereof, one of said terminals of the fourth switching means being connected to said second output, first diode means having its anode connected to said other terminal of said fourth switching means and its cathode connected to said first control coil, temperature-responsive switching means making connection between two terminals thereof, one of said terminals of the temperature-responsive switching means being connected to one end of said second control coil, said other terminal of the temperature-sensitive switching means being likewise connected to said anode of said first diode means, second diode means having its anode connected to the other end of said second control coil and its cathode connected to said first switching means.

4. The electrical power- and heat-producing system of claim 3 wherein said temperature-responsive switching means makes contact between said two terminals thereof in response to a predetermined maximum temperature and breaks contact between said two terminals in response to a predetermined minimum temperature; whereby, with said fourth switching means being closed to operate said control means to said first condition, said temperature-responsive switching means responds to said predetermined maximum temperature to break contact between said two terminals thereof thereby removing the power from said second control coil to operate both said second switching means to disconnect said second heat-producing load from said first output of said second generator means, and said third switching means to connect said electrical load of the automotive vehicle to said second output of said second generator means, said temperature-responsive switching means responding to said predetermined minimum temperature to make contact between said two terminals thereof thereby delivering power to said second control coil to operate both said second switching means to reconnect said second heat-producing load to said first output and said third switching means to disconnect said electrical load of the automotive vehicle from said second output, thereby enabling said second generator means to alternately deliver power to said second heat-producing load and to said electrical load of the automotive vehicle.

5. The electrical power and heat-producing system of claim 1 further including a second heat-producing load connected to said second switching means, said second switching means connecting said second heat-producing load to said second generator means in response to said control circuit means being operated to its said first condition and said second switching means disconnecting said second heat-producing load from said second generator means in response to said control circuit means being operated to its said second condition.

6. The electrical power and heat producing system of claim 5 further including in combination, temperature-responsive switching means having a first operating condition in response to a predetermined maximum temperature and a second operating condition in response to a predetermined minimum temperature, said temperature-responsive switching means being connected to said first and second switching means so that in response to said first generator means being connected to said second generator means by said first switching means, said temperature-responsive switching means is responsive to said predetermined maximum temperature to operate said second switching means to reconnect said second generator means to the electrical load of the automotive vehicle and to disconnect said second generator means from said second heat-producing load thereby enabling said second generator means to deliver power to the electrical load of the automotive vehicle, and said temperature-responsive switching means is responsive to said predetermined minimum temperature to operate said second switching means to reconnect said electrical generator means to said second heat-producing load and to disconnect said second electrical generator means from said electrical load of the automotive vehicle thereby enabling said second generator means to deliver power to said second heat-producing load.